3,436,299
POLYMER BONDING

George W. Halek, New Providence, and Frank M. Berardinelli, South Orange, N.J., assignors to Celanese Corporation of America, New York, N.Y., a corporation of Delaware
No Drawing. Filed Dec. 17, 1965, Ser. No. 514,651
Int. Cl. B32b 27/42, 27/08
U.S. Cl. 161—160                                14 Claims The present invention relates to articles comprising an oxymethylene polymer bonded to a solid surface, and to a process for making the articles. More particularly, the invention relates to process for adhering or bonding an oxymethylene polymer, in the presence of azobisformamide, to a solid surface.

Oxymethylene polymers have been known for many years, and because of their unique combination of stiffness, toughness, and inertness they have achieved widespread use in molded and extruded objects. In some instances, however, it is desirable to bond or adhere the oxymethylene polymer to solid surfaces such as metals and plastics.

Accordingly, the primary object of the present invention is to provide a process for adhering oxymethylene polymers to a solid surface.

Another object is to provide a bonded article comprising a foamed oxymethylene polymer adhered to a solid surface.

A further object is to provide a process for adhering thermoplastic oxymethylene polymers to a solid surface in an improved manner.

In accordance with the present invention, an oxymethylene polymer is contacted with a solid surface in the presence of azobisformamide which eventually serves as a bonding agent. The contacting materials are then heated at an elevated temperature in order to bond the polymer to the solid surface.

It has been found that the adhesive or bonding phenomenon will not occur if the azobisformamide has been substantially decomposed prior to being contacted with the solid surface. Azobisformamide, a solid at room temperature, is normally decomposed by being heated to about 200° C. or higher, whereupon nitrogen gas is evolved. Hence, in order to obtain a bonding action between the polymer and the solid surface, the azobisformamide must be decomposed while in mutual contact therewith. When the materials are bonded in this manner, the polymer itself will break apart before the polymer will separate from the solid surface.

It is quite surprising that such a strong polymer-solid bond is formed in the presence of the azobisformamide. Other known decomposing or gas evolving materials such as 4,4' - oxybis(benzenesulfonylhydrazide) and N,N'-dinitrosopentamethylenetetramine were similarly employed without satisfactory bonding occurring between the oxymethylene polymer and the solid surface.

Any solid surface may be bonded with the oxymethylene polymer by the process of the present invention, as for instance, Fiberglas, aluminum, brass, steel (including stainless, hot and cold-rolled steel), and natural and synthetic plastic materials, including oxymethylene polymers. In order to obtain the strongest bonds between the polymer and the solid, any grease, dirt, and the like are first removed from the solid surfaces. Preferably, the solid surfaces are polished with emery cloth, washed for example, with carbon tetrachloride, and then dried. Any conventional means, however, may be used for cleaning the surface of the solids.

As used herein, the term "in the presence of azobisformamide" is meant to include any form of mutual contact between the oxymethylene polymer and the azobisformamide, which in turn are contacted and heated with the solid surface. Preferably, azobisformamide and oxymethylene polymer are mixed by any conventional blending means. For example, the polymer and azobisformamide can be dry blended in a conventional rolling mill, or they can be melt blended in a conventional heated extruder. When the materials are melt blended, the melt temperatures should be maintained as low as possible, and preferably below about 170° C., in order to avoid premature decomposition of the azobisformamide. The decomposition temperature of substantially pure azobisformamide is about 200° C. However, its decomposition temperature may be lower when the azobisformamide is mixed with an oxymethylene polymer. While a small amount of premature or preliminary decomposition of the azobisformamide will not substantially affect the bond between the polymer and the solid, it is preferred that essentially no preliminary decomposition of azobisformamide occur prior to contacting the polymer-azobisformamide mixture with the solid surface. A further means for inhibiting premature decomposition is to use a coarse particle size of azobisformamide.

As an alternative to mixing the polymer and the azobisformamide to obtain the desired mutual contact, the latter may be separately applied to a solid surface, for example, by sprinkling powdered azobisformamide on a sheet of aluminum. The powdered azobisformamide can then be covered with oxymethylene polymer in the form of a powder or a preformed (molded) solid, having any desired shape.

When the azobisformamide and polymer are premixed and then contacted with and heated in the presence of a solid surface, a foamed polymer-solid surface article will be formed. The foamed or cellular structure polymer is caused by nitrogen gas being liberated or evolved from the azobisformamide upon decomposition. When the polymer and azobisformamide are not premixed, but merely contacted together with a solid surface, substantially no foaming will occur within the body of the polymer upon subsequent heating.

Preferably, when the polymer and the azobisformamide are premixed, the mixture is thereafter formed or molded into a solid article conforming to the shape of the solid surface to which the polymer is to be bonded. Usually the polymer-azobisformamide mixture is molded by compressing the materials in any suitable device such as an hydraulic press. Compression pressures up to about 50,000 p.s.i.g. or higher may be used for a period of time in the range of from about 0.1 to 10 minutes or higher. Normally, the preforms or molds are made at room temperature.

Preferably, an amount of azobisformamide in the range of from about 0.1 to 15 percent by weight of the oxymethylene polymer, and most preferably from about 0.25 to 5 percent is used to bond the polymer to the solid surface.

In order to form the bonded articles of the present invention, the contacting polymer, solid surface, and azobisformamide are heated to a temperature sufficient to liberate the nitrogen gas from the azobisformamide, i.e., the decomposition temperature. As previously mentioned, the decomposition temperature of essentially pure azobisformamide is about 200° C. However, after being premixed with oxymethylene polymer, a temperature above about 170° C., and preferably from about 180 to 210° C., is used to decompose the azobisformamide. The materials are usually maintained at the above temperature conditions for a period of time sufficient to ensure essentially complete decomposition of the azobisformamide, normally in the range of from about two minutes to several hours. The materials may also be subjected to compression pressures during the heating period.

The term "oxymethylene polymers" as used herein relates to those polymers having recurring oxymethylene units and may be prepared by the polymerization of formaldehyde or trioxane, a cyclic trimer of formaldehyde. Suitable oxymethylene polymers include oxymethylene homopolymers and copolymers. Preferred oxymethylene copolymers are those containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and do not induce undesirable reactions under the conditions involved. Particularly preferred are copolymers which contain from 60 to 99.6 mol percent of recurring oxymethylene groups and from 0.4 to about 40 mol percent of —OR— group. Most preferred are those polymers having from 85 percent to 99.6 mol percent of recurring oxymethylene groups and from 0.4 to 15 mol percent of —OR— groups. In a preferred embodiment R may be, for example, an alkylene or substituted alkylene group containing at least two carbon atoms.

Among the oxymethylene copolymers which may be utilized in accordance with this aspect of the invention are those having a structure comprising recurring units having the formula

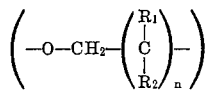

wherein $n$ is an integer from zero to 5 and wherein $n$ is zero in from 60 to 99.6 mol percent of the recurring units. $R_1$ and $R_2$ are inert substituents, that is, substituents which are free of interfering functional groups and will not induce undesirable reactions.

A preferred class of oxymethylene copolymers are those having a structure comprising oxymethylene and oxyethylene recurring units wherein from 60 to 99.6 mol percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

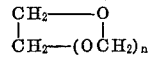

where $n$ is an integer from zero to 2.

Examples of preferred oxymethylene polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran and butadiene monoxide.

As used in this specification and claims, the term "oxymethylene" includes substituted oxymethylene, where the substituents are inert with respect to the reactions in question, that is, the substituents are free of interfering functional groups and will not introduce undesirable reactions.

As used in this specification and claims, the term "copolymer" means polymers having two or more monomeric groups, including terpolymers and higher polymers. Suitable oxymethylene terpolymers include those disclosed in U.S. patent application Ser. No. 229,715, filed Oct. 10, 1962 by W. E. Heinz and F. B. McAndrew, which is assigned to the same assignee as the subject case, now abandoned.

The preferred oxymethylene polymers which are treated in this invention are thermoplastic materials having a melting point of at least 150° C. and are normally millable at a temperature of 200° C. They have a number average molecular weight of at least 10,000. These polymers have a high thermal stability. The preferred oxymethylene polymers which are treated in this invention have an inherent viscosity of at least one (measured at 60° C. in a 0.1 weight percent solution in p-chlorophenol containing 2 weight percent of α-pinene). The preferred oxymethylene copolymers exhibit remarkable alkaline stability. For example, if the chemically stabilized copolymers are refluxed at a temperature of about 142 to 145° C. in a 50 percent solution of sodium hydroxide in water for a period of 45 minutes, the weight of the copolymer will be reduced by less than one percent.

The preferred oxymethylene copolymers are preferably stabilized by degradation of the molecular ends to a point where a stable carbon-to-carbon linkage exists at each end.

Thermal degradation, as disclosed in application Ser. No. 803,562, filed Apr. 2, 1959 now U.S. Patent No. 3,089,146 by Thomas J. Dolce and Frank M. Berardinelli, or degradation by hydrolysis, as disclosed in application Ser. No. 102,097, filed Apr. 11, 1961, U.S. Patent 3,127,344 by Frank M. Berardinelli, may be used. These applications are assigned to the same assignee as the subject application.

Other oxymethylene polymers and methods of preparation therefor are disclosed in an article Kern et al., Angewandt Chemie 73(6) 177–186 (Mar. 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethyleneically unsaturated compounds such as styrene, vinyl acetate, vinyl methyl ketone, acrolein, etc. Also these and other oxymethylene polymers are disclosed by Sittig in Petroleum Refiner, volume 41, number 11, November 1962, pages 131 through 170.

In addition to the above-mentioned oxymethylene copolymers, oxymethylene homopolymers of trioxane or formaldehyde may also be treated in accordance with this invention. It may be desirable to "end cap" the homopolymer molecules by the known methods of etherification or esterification.

If desired, the oxymethylene polymers may also contain any suitable coloring agents, additives or fillers, including glass, carbon black, titanium dioxide, finely divided copper and the like. In addition, chemical stabilizers such as scission inhibitors, which are well known and frequently used with oxymethylene polymers, may be added.

The present invention is additionally illustrated by the following examples.

EXAMPLE I

A dry blend of 200 grams of a commercial oxymethylene copolymer (trioxane plus ethylene oxide) and 2 grams of azobisformamide was prepared by rolling on a mill for one half hour. The mixture was then used to prepare 5½ gram discs or preforms, 2" x 1/16", by being compressed at room temperature and 40,000 lbs. pressure for one minute. These preforms were then placed or "sandwiched" between outer solid surfaces of brass, stainless steel, cold-rolled steel, hot-rolled steel, Formica, and Fiberglas. The surfaces of the outer skin materials were quite smooth and were merely cleaned by swabbing with carbon tetrachloride.

The sandwiches were thereafter individually compressed in a tight fitting mold at 190° C. for 6 minutes at an initial pressure of 6,500 p.s.i.g. The pressure was removed, the mold was air cooled to 150° C., and then cooled to room temperature in cold water. As a result of the above heat and compression treatment in the molding apparatus, the azobisformamide decomposed and thereby caused the oxymethylene copolymer to foam and to adhere tenaciously to the outer sandwich skins. Hence, the resulting sandwiches comprised outer solid surfaces of the above-mentioned materials with foamed oxymethylene copolymer as the core. Each of the sandwiches adhered very well. It was subsequently possible to pry apart the sandwiches made with Fiberglas and cold-rolled steel, although with great difficulty. However, some of the copolymer remained stuck to the outer skins even after prying apart. In the case of the sandwiches made from outer skins of brass, stainless and hot-rolled steel, and Formica, it was not possible to pry the skins apart because the foamed oxymethylene core ruptured rather than the polymer-solid surface bond.

EXAMPLE II

The same kind of outer skin materials as used in Example I above were used in this example, except that the outer skins or solid surfaces were polished with No. 320 emery cloth to remove any surface coatings of grease, dirt, and the like. The solid surfaces were then lightly scored with No. 80 emery cloth, washed with carbon tetrachloride, and dried.

A first set of these outer skins were used to prepare sandwiches containing a preformed disc of oxymethylene copolymer and azobisformamide as the core material. The discs were prepared as in Example I. A second set of the outer skins were used to prepare sandwiches containing a preformed disc of oxymethylene copolymer as the core material (no azobisformamide being present).

Both sets of sandwiches were then individually compressed in a tight fitting mold at 190° C. for 6 minutes at an initial pressure of 6,500 p.s.i.g. The pressure was removed, the mold was air cooled to 120° C., and then the mold was opened without water cooling and allowed to cool to room temperature. As in Example I, all of the sandwiches containing the mixture of polymer and azobisformamide yielded sandwiches comprising a foamed core of oxymethylene copolymer. These sandwiches showed excellent adhesion. However, all of the sandwiches which did not contain azobisformamide, but merely comprised a core of oxymethylene copolymer and outer solid surfaces, showed very poor adhesion and most of them fell apart upon being cooled to room temperature.

EXAMPLE III

The adhesive properties of two additional foaming or gas forming agents were compared with azobisformamide by dry blending, in the manner of Example I, 50 grams of oxymethylene copolymer with 0.75 gram of 4,4'-oxybis(benzenesulfonylhydrazide) in one test and 50 grams of oxymethylene copolymer with 0.50 gram of N,N'-dinitrosopentamethylenetetramine in another test. The dry blends were then formed into discs or preforms as in Example I.

Three sandwiches were prepared using as the core material the above preformed discs of oxymethylene copolymer and foaming agents, and a preformed disc of oxymethylene copolymer and azobisformamide, prepared as in Example I. The preforms were sandwiched between outer skins or solid surfaces of aluminum which had been surface treated as in Example II. The sandwiches were subsequently compressed in a tight fitting mold at 190° C. for 6 minutes at an initial pressure of 1,600 p.s.i.g. The pressure was removed, the mold was air cooled to 120° C., and then opened without water cooling and allowed to cool to room temperature.

The sandwiches containing oxymethylene core material with 4,4' - oxybis(benzenesulfonylhydrazide) and N,N'-dinitrosopentamethylenetetramine exhibited no adhesion and fell apart upon being cooled to room temperature. However, the sandwich having the oxymethylene copolymer-azobisformamide core exhibited excellent adhesion and could not be pulled apart.

EXAMPLE IV

A small amount of azobisformamide was placed in an aluminum dish and heated to a temperature of about 200° C. in a circulating air oven to essentially decompose the azobisformamide. A blend containing 0.7 percent by weight of the resulting solid decomposition product and oxymethylene terpolymer was prepared. The blend was compressed into a disc (as in Example I) and then placed between outer layers of aluminum which had been surface treated as in Example II. The sandwich was thereafter compression molded at 190° C., for 6 minutes at 1,600 p.s.i.g. The resulting product sandwich was easily pried apart and did not exhibit any adhesive properties.

In an additional test, 2 percent by weight of azobisformamide was dry-blended with oxymethylene terpolymer and formed into a disc as in Example I. The preform was heated in a 200° C. oven for 1 hour, removed, chopped into small pieces, and then heated at 185° C. for an additional hour to ensure full decomposition of the azobisformamide. The material was thereafter further pulverized, and then compressed into a disc (as in Example I). The disc was placed between outer layers of aluminum which had been surface treated as in Example II. The resulting sandwich was then compression molded at 190° C. for 6 minutes at 1,600 p.s.i.g. The product sandwich fell apart upon being cooled to room temperature.

EXAMPLE V

An aluminum disc, which had been cleaned with carbon tetrachloride and dried, was coated with a very light sprinkling of powdered azobisformamide. A molded sheet of oxymethylene copolymer, having a thickness of 30 mil, was placed on top of the azobisformamide, and the oxymethylene sheet was in turn covered by a similar aluminum disc.

The sandwich was then placed between two, 2 inch thick steel plates and heated in a 180° C. oven for 2½ hours. Upon removal and cooling to room temperature it was observed that the aluminum disc which had not been sprinkled with azobisformamide did not adhere to the oxymethylene copolymer, while the azobisformamide-treated aluminum disc was firmly bonded to the oxymethylene copolymer.

EXAMPLE VI

Foamed oxymethylene laminates were prepared by dry-blending oxymethylene terpolymer (comprising trioxane, ethylene oxide, and pentaerythritol diformal) with azobisformamide. These laminates were prepared with the outer skins comprising sheets of molded oxymethylene copolymer, aluminum, and Formica.

In forming the laminate having outer skins of oxymethylene, a bottom sheet of the oxymethylene copolymer was placed into a 25-ton hydraulic compression molding device. The powdered mixture of oxymethylene terpolymer and azobisformamide was then poured into the mold on top of the bottom sheet. The material was then compacted at 50,000 p.s.i.g. The pressure was released and a top sheet of oxymethylene copolymer was then added. The material was again compacted at 50,000 p.s.i.g. for 10 seconds. The pressure in the hydraulic press was then reduced to 1,000 lbs. and maintained at that level. Heat was applied to the compression device and a timer started. The mold was at 165° C. at the 10 minute mark, and 175° C. at the 15 minute mark. As the polymer melted additional compression was required to maintain the pressure at 1,000 lbs. At the 20 minute mark the pressure was slowly reduced to 200 lbs. over 2 minute period. The pressure within the molding device was then slowly released allowing the laminate to expand (the expansion being caused by the foaming of the oxymethylene terpolymer core). When the foaming and expansion was completed the laminate was then heated for an additional 5 minutes at about 175° C. Cold water was then applied to the hydraulic press and the laminate was cooled to 30° C. within 5 minutes for removal therefrom.

Laminates were prepared in a similar manner using outer surfaces of aluminum and Formica. All of the laminates comprised fine foamed cores with well adhered skins. The inner foamed core of the laminates had a density of 0.3 g./cc.

As can be seen from the above examples, a unique bonding action occurs between oxymethylene polymer and solid surfaces when the materials are heated in the presence of azobisformamide. The bonded articles formed by the process of the present invention may be used in any conventional manner, for example, as a strengthening layer for other plastic and nonplastic solid surfaces, as an additional insulating layer, and to form laminates having a foamed inner core which are finding many uses as construction materials.

The principle, preferred embodiments, and modes of operation of the present invention have been described in the foregoing specification. However, it should be understood that the invention, which is intended to be protected herein, may be practiced otherwise than as described without departing from the scope of the appended claims.

We claim:

1. A process for bonding an oxymethylene polymer to a solid surface, which comprises contacting said oxymethylene polymer in the presence of azobisformamide with said solid surface, and heating the contacting materials at an elevated temperature to adhere the oxymethylene polymer to the solid surface.

2. The process of claim 1 wherein the contacting materials are heated to a temperature sufficient to substantially decompose the azobisformamide and liberate nitrogen gas.

3. The process of claim 1 wherein the contacting materials are heated to a temperature above about 170° C.

4. The process of claim 1 wherein the solid surface is a metal surface.

5. The process of claim 1 wherein the solid surface is a plastic surface.

6. The process of claim 1 wherein the oxymethylene polymer is a solid thermoplastic copolymer having at least 60 mol percent of recurring oxymethylene groups.

7. The process of claim 6 wherein the copolymer comprises trioxane and ethylene oxide.

8. The process of claim 1 wherein an amount of azobisformamide in the range of from about 0.1 to 15 percent by weight of the oxymethylene polymer is incorporated in the polymer.

9. An aritcle prepared by the process of claim 1.

10. A process for forming a bonded article of foamed oxymethylene polymer and a solid surface, which process comprises mixing a thermoplastic oxymethylene polymer with azobisformamide, contacting the mixture with a solid surface, and compressing and heating the contacting materials at a temperature in the range of from about 180 to 210° C. for a period of time sufficient to cause the oxymethylene polymer to form a foamed structure which adheres to the solid surface.

11. The process of claim 10 wherein an amount of azobisformamide in the range of from about 0.25 to 5 percent by weight of the oxymethylene polymer is used.

12. The process of claim 10 wherein the solid surface is treated to remove surface film therefrom prior to being contacted with the mixture of oxymethylene polymer and azobisformamide.

13. An article prepared by the process of claim 10.

14. A laminated article comprising an inner core of foamed oxymethylene polymer bonded to outer layers of a solid material, the bonding and foaming of the core having been caused by heating the polymer core and outer material while in contact with each other in the presence of azobisformamide, said heating being at a temperature in the range of from about 180 to 210° C. and the materials being maintained under a compression pressure of up to 50,000 p.s.i.g. during at least a portion of the heating period.

References Cited

UNITED STATES PATENTS

| | | | |
|---|---|---|---|
| 2,592,081 | 4/1952 | Toulmin | 156—79 X |
| 2,653,917 | 9/1953 | Hammon | 260—67 |
| 3,093,525 | 6/1963 | Wilson et al. | 156—79 |
| 3,239,365 | 3/1966 | Petry | 156—78 X |
| 3,248,271 | 4/1966 | Rietty et al. | 161—257 X |
| 3,262,805 | 7/1966 | Tomoo Aoki | 156—79 X |
| 3,376,278 | 4/1968 | Morgan et al. | 260—67 |
| 3,380,866 | 4/1968 | Ginter | 156—78 X |

EARL M. BERGERT, *Primary Examiner.*

C. B. COSBY, *Assistant Examiner.*

U.S. Cl. X.R.

156—79, 320; 161—257, 258, 215; 260—67, 2.5